US012679690B2

(12) United States Patent
Agate et al.

(10) Patent No.: US 12,679,690 B2
(45) Date of Patent: Jul. 14, 2026

(54) FIGURE 8 HOSE ROLLER

(71) Applicants: Victoria Elizabeth Agate, Shawnigan Lake (CA); Wesley Francis Hyde, Shawnigan Lake (CA)

(72) Inventors: Victoria Elizabeth Agate, Shawnigan Lake (CA); Wesley Francis Hyde, Shawnigan Lake (CA)

( * ) Notice: Subject to any disclaimer, the term of this patent is extended or adjusted under 35 U.S.C. 154(b) by 170 days.

(21) Appl. No.: 18/403,307

(22) Filed: Jan. 3, 2024

(65) Prior Publication Data

US 2025/0214803 A1 Jul. 3, 2025

(51) Int. Cl.
*B65H 54/58* (2006.01)
*A62C 33/00* (2006.01)
*B65H 54/44* (2006.01)

(52) U.S. Cl.
CPC ........... *B65H 54/585* (2013.01); *B65H 54/44* (2013.01); *A62C 33/00* (2013.01); *B65H 2403/481* (2013.01); *B65H 2701/332* (2013.01)

(58) Field of Classification Search
None
See application file for complete search history.

(56) References Cited

U.S. PATENT DOCUMENTS 2,225,180 A * 12/1940 Olesen .................. B65H 54/58 242/125.1
4,475,698 A * 10/1984 Militello .............. B65H 54/585 242/537
5,388,609 A * 2/1995 Ghio ...................... A62C 33/04 137/355.27
7,243,475 B1 * 7/2007 Cady ..................... B65B 43/123 53/384.1
8,955,786 B2 * 2/2015 Motoji ................... A62C 33/04 242/391.2
9,884,214 B1 * 2/2018 Al-Mutairi ........... B65H 54/585
2004/0089761 A1 * 5/2004 Tsao ....................... A62C 33/04 242/532.6
2009/0166463 A1 * 7/2009 Mosher .............. B65H 75/4492 242/406
2011/0220756 A1 * 9/2011 Mosher .............. B65H 75/4492 242/476.1
2017/0217721 A1 * 8/2017 Morgan .................. F16D 41/02
2024/0300777 A1 * 9/2024 Moore ................. B65H 54/585

OTHER PUBLICATIONS

Preston Starr [prestonstarr7337]. (Jul. 1, 2014). "Figure 8 Hose Roller Assembly" [Video]. YouTube. https://youtu.be/QRVuwN9tU08?si =_wuzN0oHtVvb_Vhe Retrieved Jun. 24, 2024.

* cited by examiner

*Primary Examiner* — William A. Rivera

(57) ABSTRACT

A hose roller is described. An input shaft is coupled to a handle to be rotatably drivable by rotation thereof. A sun sprocket is drivably coupled to the input shaft. A chain is engaged with the sun sprocket and a planetary sprocket, offset from the sun sprocket, to drivably couple the planetary sprocket to the sun sprocket. An intermediate shaft is drivably coupled to the planetary sprocket. A universal joint is connected to the intermediate shaft and an output shaft, angled relative to the intermediate shaft, to drivably couple the output shaft to the intermediate shaft. An output support is offset from and drivably coupled to the input shaft. An output shaft bearing is disposed between the output shaft and the output support to support and to allow rotation of the output shaft. A spool is coupled to the output shaft to be rotatably driven by the output shaft.

2 Claims, 7 Drawing Sheets

FIGURE 8 HOSE ROLLER

TECHNICAL FIELD

The disclosure relates generally to devices for handling hoses, and more particularly to hose rollers.

BACKGROUND

U.S. Pat. No. 8,955,786 B2 describes a device for taking up a fire-fighting hose. Wheels are rotatably supported at the lower part of a frame body, and a handle is provided to the upper part of the frame body. The frame body can be moved by rotating the wheels by pushing or pulling the handle. A rotatable reel on which hose is wound is provided to the frame body, a power transmitting circulation member is passed over the rotating shaft of the reel and the rotation support shaft of the wheels to enable the reel to rotate in association with the rotation of the wheels. A core member for a single-layer winding and a core member for double-layer winding, which are interchangeable, are provided to the reel, and either the core member for a single-layer winding or the core member for double-layer winding can be removably affixed to a rotating shaft of a base plate of the reel.

U.S. Pat. No. 9,884,214 B1 describes a hose winding device that has an open rectangular parallelepiped skeleton frame made of tubular members. The upper cross members at opposite ends of the frame include a lower wringer roller mounted on a shaft fixed to opposite sides of the frame and an upper wringer roller spaced above the lower wringer roller. The wringer rollers compress and flatten the fire hose as it is cranked through the wringer rollers, thereby removing any water left inside the hose. A pair of spaced apart, vertical guide rollers are mounted closely behind the wringer rollers, the four rollers being configured similar to a winch's roller fairlead, permitting the hose to be smoothly wound on the device without first straightening the hose. A hand crank is removably mounted to opposite sides of the frame halfway between opposite ends of the frame. The crank has a hose coupler retainer extending parallel to the crank's axle.

U.S. Pat. No. 4,056,241 A describes a device for rolling up collapsible fire hose. It has a rotatably mounted drum with one open face and a slot in the periphery. The drum is mounted on the lower end of an elongated handle. The handle has hand grips on its upper end so a user can roll the drum along a flat surface by holding the handle. The coupling on one end of a fire hose is inserted in the drum through the open drum face with the adjacent portion of the hose flattened and inserted in the peripheral slot. The hose is spread out on a ground surface and the drum is then pushed along the path of the hose, so the hose is flattened and rolled around the drum periphery.

SUMMARY

In some aspects, there is described a hose roller. The hose roller comprises a handle; an input shaft coupled to the handle to be rotatably drivable by rotation of the handle; a sun sprocket drivably coupled to the input shaft to be rotatably driven by the input shaft; a planetary sprocket offset from the sun sprocket lateral to a rotational axis of the input shaft; a chain engaged with the sun sprocket and the planetary sprocket to drivably couple the planetary sprocket to the sun sprocket; an intermediate shaft coupled to the planetary sprocket to be rotatably drivable by the planetary sprocket; an output shaft angled relative to the intermediate shaft and offset from the input shaft lateral to the rotational axis; a universal joint connected to the intermediate shaft and the output shaft to drivably couple the output shaft to the intermediate shaft; an output support offset from the input shaft and connected to the input shaft to be rotatably driven by the input shaft around the input shaft; an output shaft bearing disposed between the output shaft and the output support to support the output shaft by the output support and to allow rotation of the output shaft relative to the output support; and a spool coupled to the output shaft to be rotatably driven by the output shaft and engageable with a hose so as to form a figure eight hose roll by rotation of the handle.

In some aspects, there is described a spool for a hose roller. The spool comprises a tubular body that tapers away from an output shaft of the hose roller, the tubular body defining a longitudinally extending slit formed in the tubular body.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

The following disclosure relates to a figure eight hose roller. The hose roller may be a collapsible hose roller on a tripod stand. When cranked by hand, a planetary gear box rotates. Due to a 3:1 ratio between the sun and planetary sprockets, the hose spool spins two rotations per orbit on a 15-degree offset angle. This action coils the hose with two lobes that intersect at a common point, thereby defining a figure eight. To deploy the hose, the two lobes are opened away from each other exposing the inside intersection. Uncoiling the hose from the center results in the twist from one lobe canceling out the twist of the other.

Aspects of various embodiments are described in relation to the figures.

Figure 1:
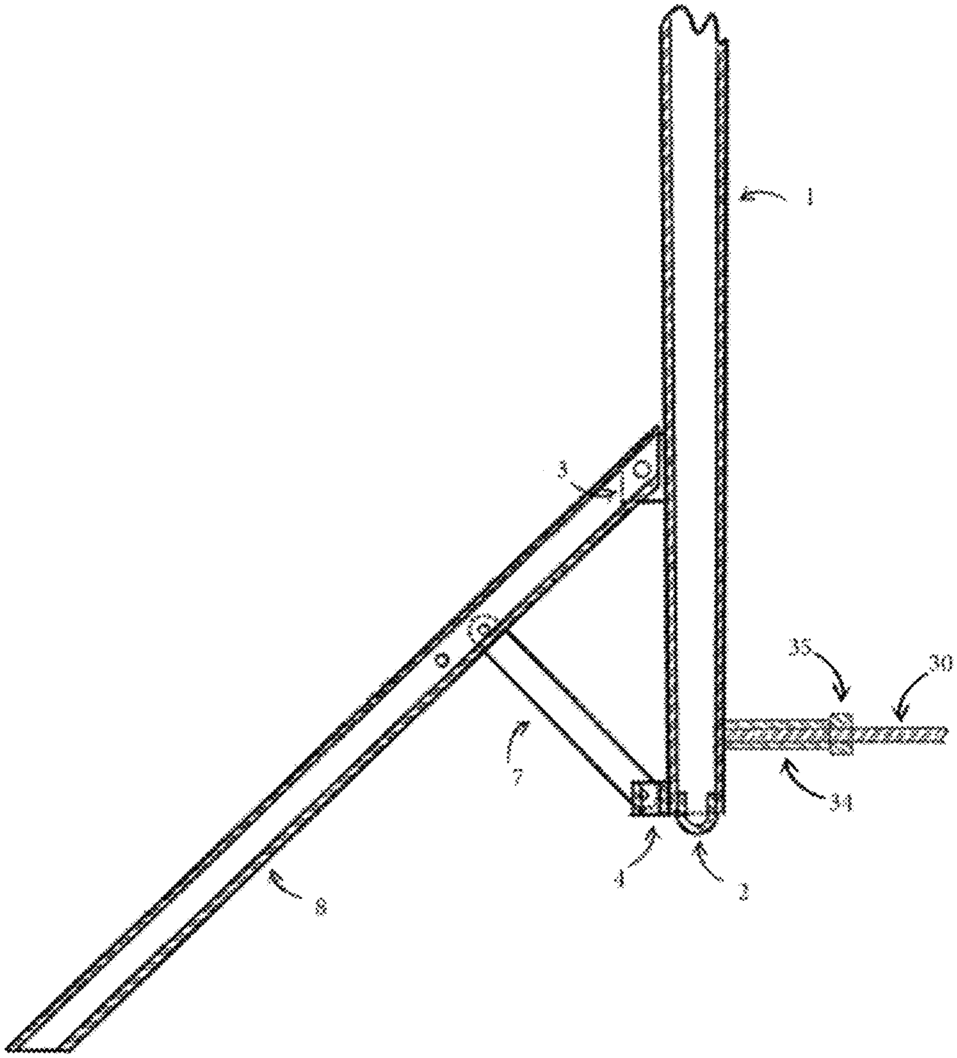
FIG. 1 is a cross-sectional view of a stand as deployed, in accordance with an embodiment.

FIG. 1 is a cross-sectional view of a stand as deployed, in accordance with an embodiment.

Figure 2:
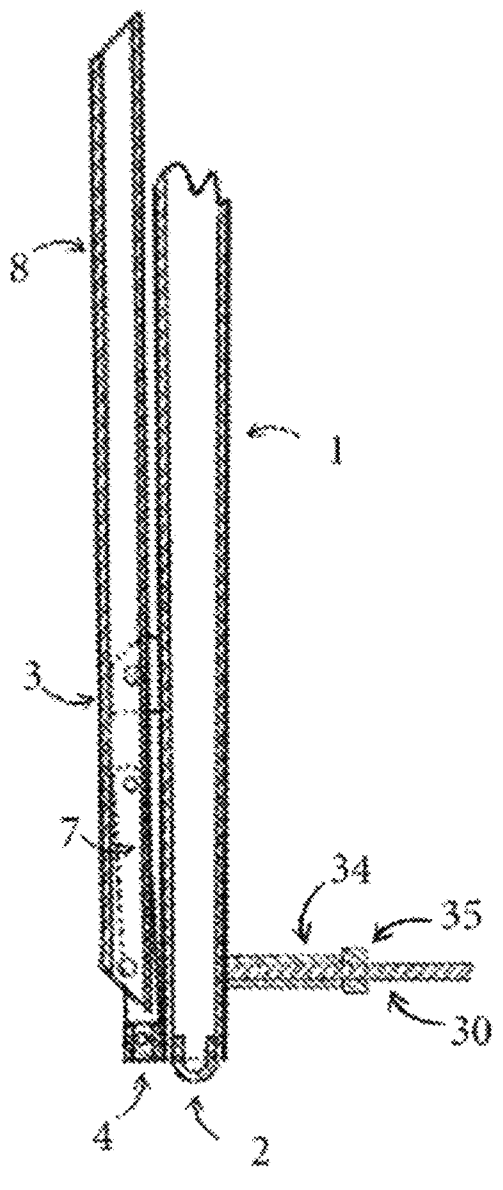
FIG. 2 is a cross-sectional view of the stand in a collapsed position, in accordance with an embodiment.

FIG. 2 is a cross-sectional view of the stand in a collapsed position, in accordance with an embodiment.

Figure 3:
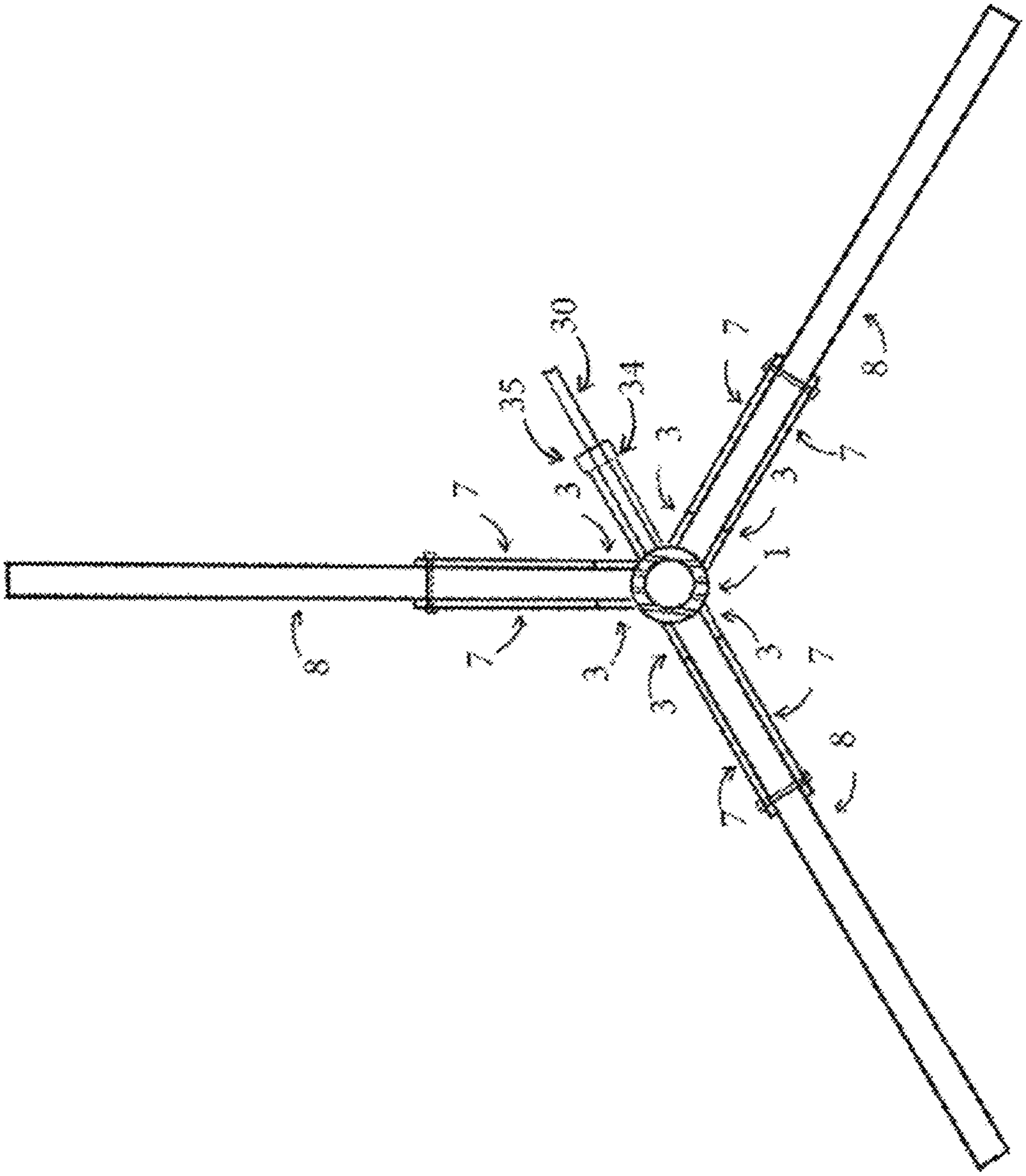
FIG. 3 is a top view of a base, in accordance with an embodiment.

FIG. 3 is a top view of a base, in accordance with an embodiment.

Figure 4:
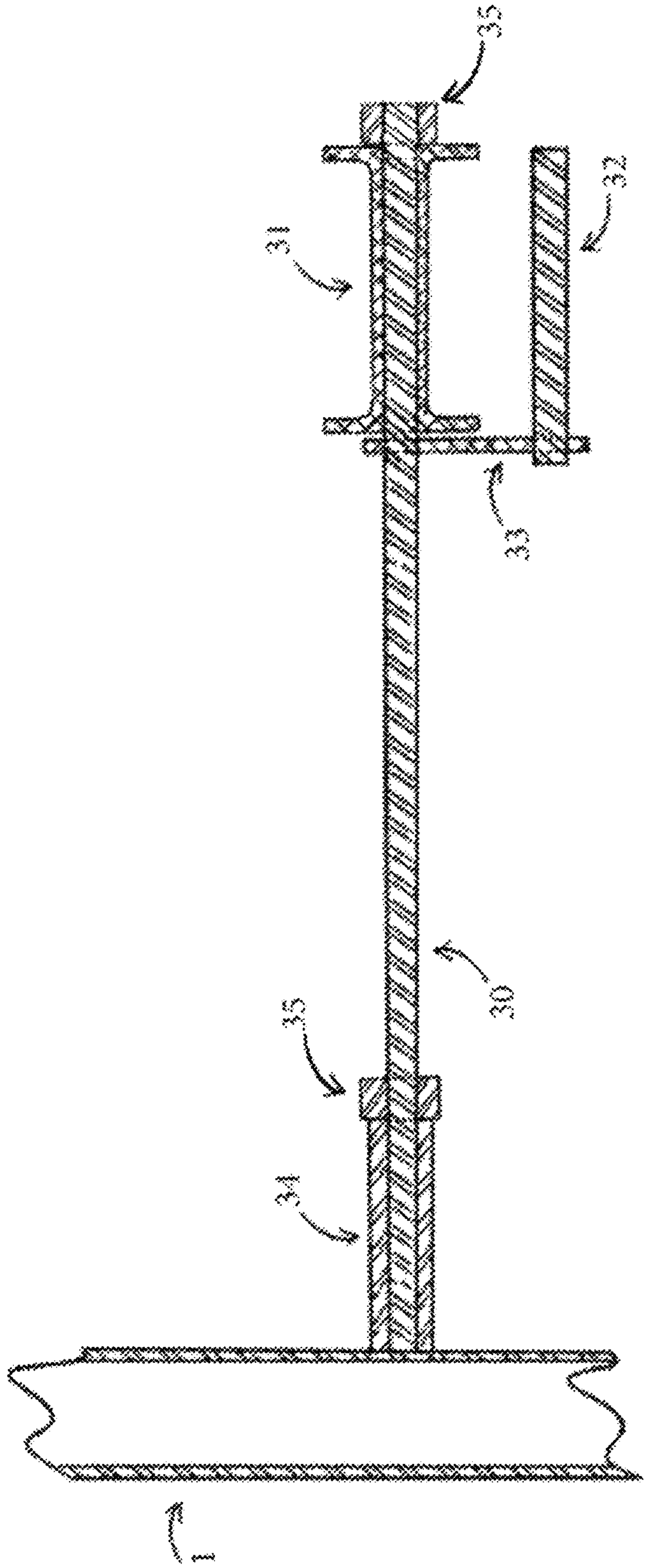
FIG. 4 is a cross-sectional view of a roller guide, in accordance with an embodiment.

FIG. 4 is a cross-sectional view of a roller guide, in accordance with an embodiment.

Referring to FIGS. 1-4, a post 1 is connected to three legs 8, extending outwardly from the post 1, via clevis plates 3. Each leg 8 is braced to the post 1 by a corresponding brace 7 connected to the leg 8 and mounted to the post 1 via a corresponding brace mount 4. In various embodiments, the post 1 may be a pipe that is 36" long and 1½" diameter. In various embodiments, the clevis plates 3 may be custom cut 3⁄16" plates. Six clevis plates 3 may be provided. In various embodiments, the brace 7 may have dimensions of 10"×1"×⅛" and may define ¼" holes and radius ends. Six braces 7 may be provided. A D-ring 2 is positioned in the post 1, at an end thereof. In various embodiments, the D-ring 2 may be a 5⁄16" bar stock. A guide bar 30 is connected to the post 1 and extends outwardly therefrom. In various embodiments, the guide bar 30 may be a ½" steel bar. The guide bar 30 is mounted to the post 1 at a first end of the guide bar 30 via a mount 34 coupled to a shaft collar 35. In various embodiments, the mount 34 may be a ½" diameter steel pipe of length 4". In various embodiments, each leg 8 may comprise square tubing that is 1¼" by 1¼" in cross-section and with mitered ends. Three legs 8 may be provided. In various embodiments, each leg 8 may be 28" long. A guide roller 31 is coupled to the guide bar 30 at a second end of the guide bar 30 spaced apart from the first end of the guide bar 30 such that the guide roller 31 is distant from the post 1. In various embodiments, the guide roller 31 may be a custom turned aluminum roller. A safety bar 32 is mounted on to the guide bar 30 via a safety bar mount 33 that spaces the safety bar 32 away from the guide bar 30 in a direction lateral to a longitudinal direction of the guide bar 30. In various embodiments, the safety bar mount 33 may be a custom aluminum safety bar mount 33. In various embodiments, the safety bar 32 may be ½" steel bar stock. A shaft collar 35 is positioned at a terminal end of the guide bar 30. In various embodiments, the shaft collar 35 may be a ½" shaft collar. Two shaft collars 35 may be provided.

Figure 5:
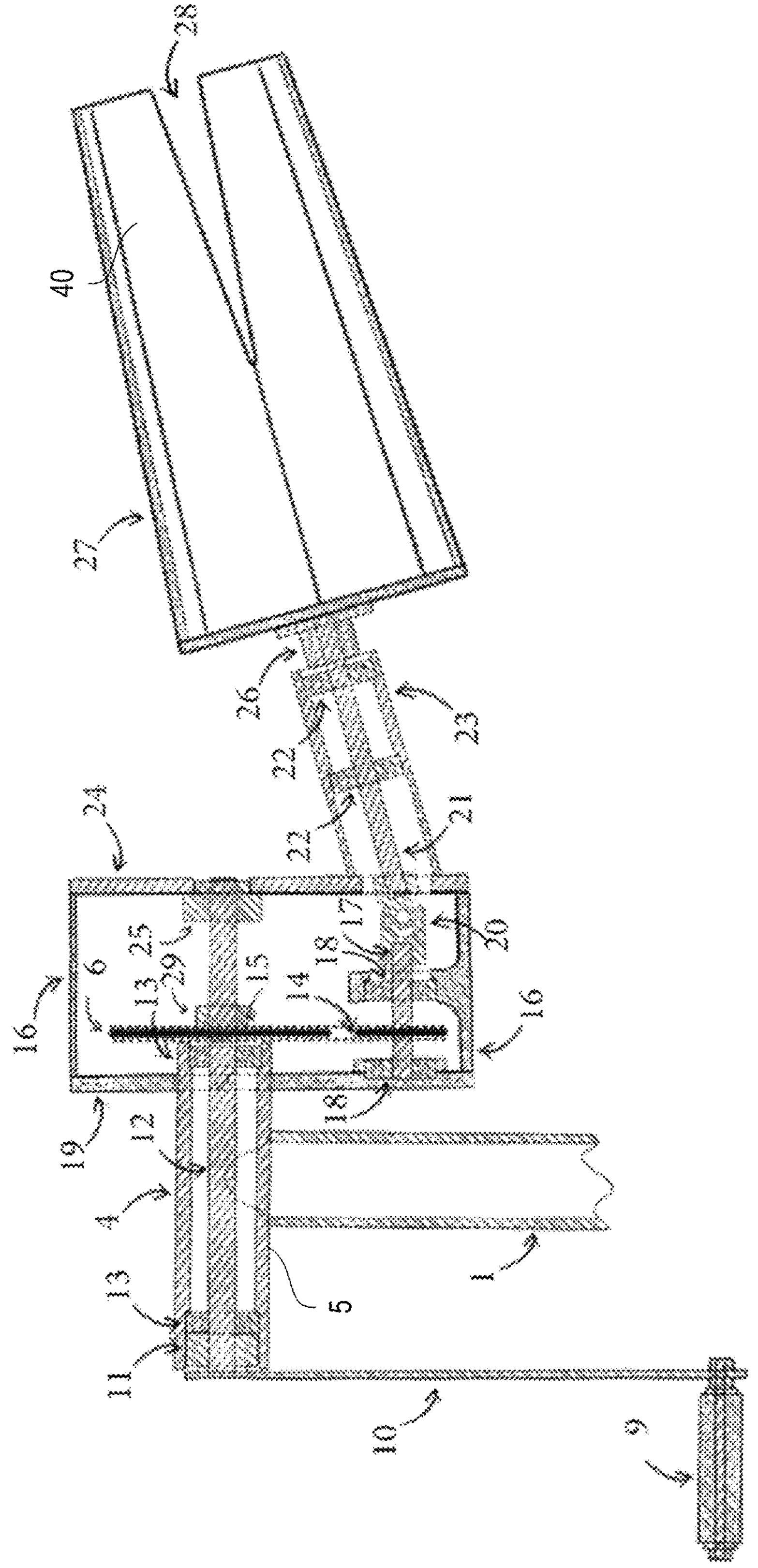
FIG. 5 is a cross-sectional view of a hose roller, in accordance with an embodiment.

FIG. 5 is a cross-sectional view of a hose roller, in accordance with an embodiment.

Referring to FIG. 5, a brace mount 4 connects the post 1 to an input housing 5 containing an input shaft 12. In various embodiments, the brace mount 4 may be square tubing that is 1¼" by 1¼" in cross-section. Three brace mounts 4 may be provided. In various embodiments, the input shaft 12 may be a ¾" keyed shaft of length 8". Input bearings 13 are disposed between the input shaft 12 and the input housing 5 to support the input shaft 12 in the input housing 5 while allowing rotation of the input shaft 12 relative to the input housing 5. In various embodiments, the input housing 5 may be a custom turned steel tube. A first input bearing 13 may be positioned at a first end of the input housing 5 and a second input bearing 13 may be positioned at a second end of the input housing 5. In various embodiments, the input bearings 13 may be ¾" bearings. Two input bearings 13 may be provided. The input shaft 12 is coupled to a handle 9 to be rotatably driven by rotation of the handle 9. The handle 9 is connected to the input shaft 12 via a handle hub 11. The handle hub 11 is connected to the handle 9 via a handle arm extending away from the input shaft 12. Rotating handle 9 around the input shaft 12 causes rotation of the input shaft 12, which rotation drives the hose roller for rolling a hose. In various embodiments, the handle 9 may be a custom turned aluminum handle. In various embodiments, the handle arm 10 may have dimensions of 1½" by 12"×3⁄16" with holes in each end. In various embodiments, the handle hub 11 may be a ¾" v-hub.

As shown in FIG. 5, the input shaft 12 extends into a gear case 16. The gear case 16 may be a box with open ends, e.g. such a box may have a cross-section with dimensions 6¼" by 7¾" in some embodiments. A front end of the gear case 16 may have disposed thereon a face plate 24, while a back end of the gear case 16 may have disposed thereon a back plate 19. In various embodiments, the back plate 19 may be a 5¼"×7¾" plate. The face plate 24 has disposed thereon a face plate hub 25 formed around the input shaft 12. Rotational driving of the face plate 24, and hence the gear case 16, by the input shaft 12 is thereby achieved. In various embodiments, the face plate 24 may be a 5¼"×7¾" plate. In various embodiments, the face plate hub 25 may be a ¾" v-hub.

Again referring to FIG. 5, a sun sprocket 6 is drivably coupled to the input shaft 12 to be rotatably driven by the input shaft 12. A shaft collar 29, e.g. a ¾" shaft collar, is engaged around the input shaft 12 and with the sun sprocket 6. A chain 15 is engaged with the sun sprocket 6 and a planetary sprocket 14 to drivably couple the planetary sprocket 14 to the sun sprocket 6. The planetary sprocket 14 is offset from the sun sprocket 6 lateral to a rotational axis of the input shaft 12. In various embodiments, the chain 15 may be a #35 chain. An intermediate shaft 17 is coupled to the planetary sprocket 14 to be rotatably drivable by the planetary sprocket 14. In various embodiments, the intermediate shaft 17 may be a ⅝" keyed shaft of length 3". A universal joint 20 is connected to the intermediate shaft 17 and an output shaft 21 to drivably couple the output shaft 21 to the intermediate shaft 17. In various embodiments, the output shaft 21 may be a ⅝" keyed shaft of length 5". In various embodiments, the universal joint 20 may be a ⅝" universal joint. The output shaft 21 is angled relative to the intermediate shaft 17 at a non-zero angle and is non-perpendicular to the intermediate shaft 17. The output shaft 21 is angled at a 15 degree offset angle relative to the intermediate shaft 17 and the gear case 16. The output shaft 21 is offset from the input shaft 12 lateral to the rotational axis of the input shaft 12. The output shaft 21 extends outwardly from the gear case 16. The output shaft 21 is supported by an output support 23 via an output shaft bearing 22. The output shaft bearing 22 is disposed between the output shaft 21 and the output support 23 to support the output shaft 21 by the output support 23 and to allow rotation of the output shaft 21 relative to the output support 23. In various embodiments, the output support 23 may be a custom turned steel tube. The output support is attached to the gear case 16 via the face plate 24. The output support 23 is offset from the input shaft 12 and is connected to the input shaft 12 to be rotatably driven by the input shaft 12 around the input shaft 12. In various embodiments, the output shaft bearing 22 may be a ⅝" bearing. Four output shaft bearings 22 may be provided. A spool hub 26 is formed around an end of the output shaft 21. In various embodiments, the spool hub 26 may be a ⅝" keyed hub with flange. The spool hub 26 is connected to a spool 27. The spool 27 is coupled to the output shaft 21 to be rotatably driven by the output shaft 21. The spool 27 is a hose spool defining a tubular body 40 that cross-sectionally tapers away from the spool hub 26 and the output shaft 21. The spool 27 may be constructed of aluminum. A longitudinally extending slit 28 is formed in the tubular body 40. The tubular body 40 may define a hexagonal cross-section. The spool 27, via the tubular body 40, is engageable with a hose so as to form a figure eight hose roll by rotation of the handle 9. In various embodiments, the sun sprocket 6 may be a 36 tooth #35 ANSI W hub sprocket. In various embodiments, the planetary sprocket 14 may be a 12 tooth #35⅝" keyed hub sprocket. As such, when the sun sprocket 6 is a 36 tooth sprocket and the planetary sprocket 14 is a 12 tooth sprocket, assuming similar tooth and gap widths, a gear ratio of 3:1 is achieved. As the spool 27 rotates, the orientation of the spool 27 relative to the hose changes, which changes the position on the spool where the hose engages, thereby causing a figure eight roll, as shown in FIGS. 6A-6F.

FIGS. 6A-6F illustrate rolling of the hose.

Figure 6A:
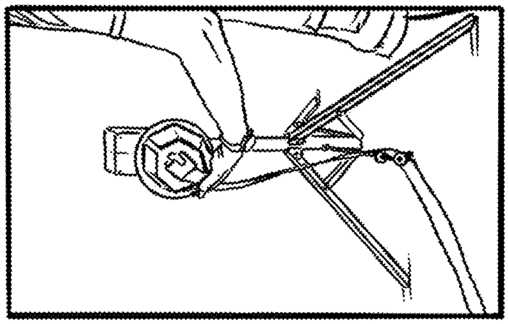
FIG. 6A illustrates rolling of a hose at a step when the hose is being loaded on to a hose roller to form a roll of hose.

FIG. 6A illustrates rolling of a hose at a step when the hose is being loaded on to a hose roller to form a roll of hose.

Figure 6B:
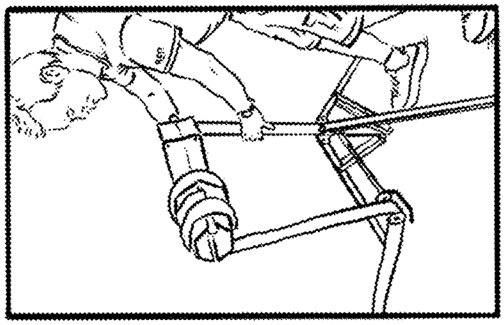
FIG. 6B illustrates rolling of the hose at a step involving the beginning of the roll of hose on the hose roller.

FIG. 6B illustrates rolling of the hose at a step involving the beginning of the roll of hose on the hose roller.

Figure 6C:
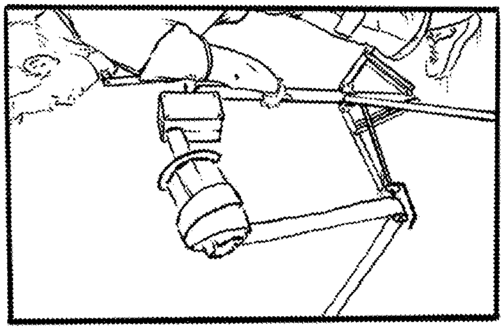
FIG. 6C illustrates rolling of the hose at a step when a quarter of the roll of hose is on the hose roller.

FIG. 6C illustrates rolling of the hose at a step when a quarter of the roll of hose is on the hose roller.

Figure 6D:
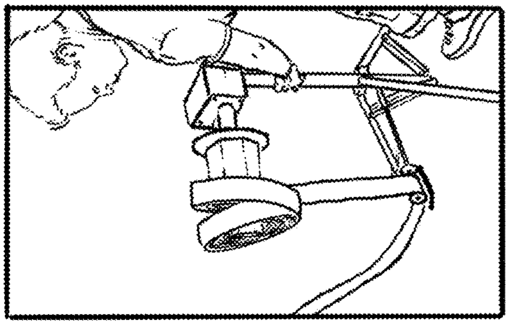
FIG. 6D illustrates rolling of the hose at a step when half of the roll of hose is on the hose roller.

FIG. 6D illustrates rolling of the hose at a step when half of the roll of hose is on the hose roller.

Figure 6E:
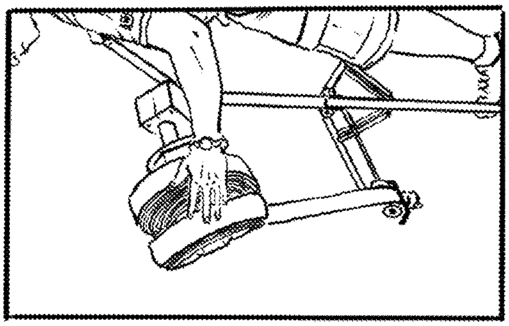
FIG. 6E illustrates rolling of the hose at a step involving the end of the roll of hose on the hose roller.

FIG. 6E illustrates rolling of the hose at a step involving the end of the roll of hose on the hose roller.

Figure 6F:
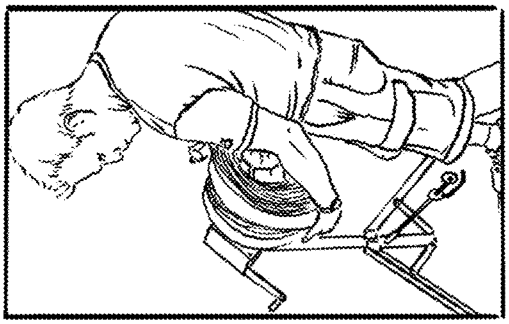
FIG. 6F illustrates rolling of the hose at a step when the hose is being taken off the hose roller.

FIG. 6F illustrates rolling of the hose at a step when the hose is being taken off the hose roller.

FIGS. 7A-7F illustrate hose deployment.

Figure 7A:
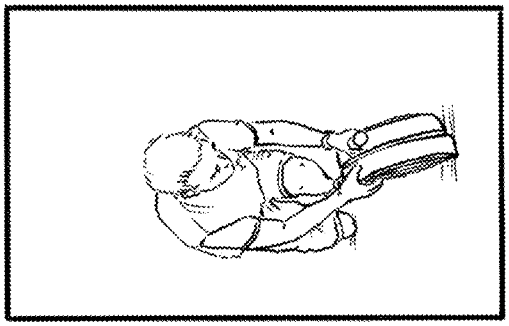
FIG. 7A illustrates hose deployment at a step when a roll of hose is about to be opened.

FIG. 7A illustrates hose deployment at a step when a roll of hose is about to be opened.

Figure 7B:
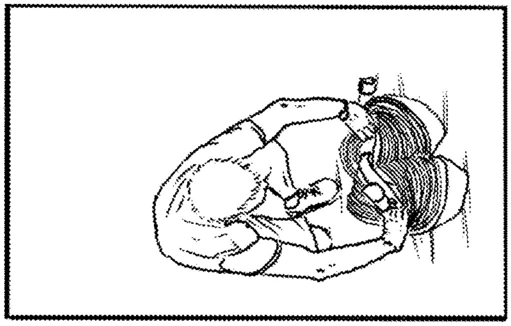
FIG. 7B illustrates hose deployment at a step when the roll of hose is being "cracked" open.

FIG. 7B illustrates hose deployment at a step when the roll of hose is being "cracked" open.

Figure 7C:
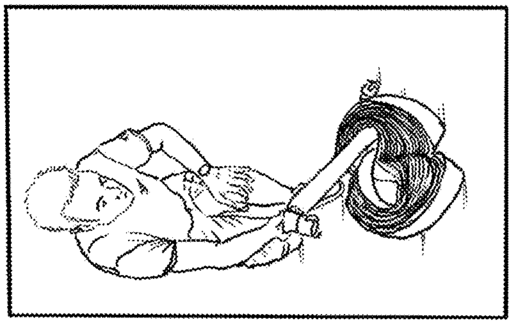
FIG. 7C illustrates hose deployment at a step when the roll of hose is being deployed from the center.

FIG. 7C illustrates hose deployment at a step when the roll of hose is being deployed from the center.

Figure 7D:
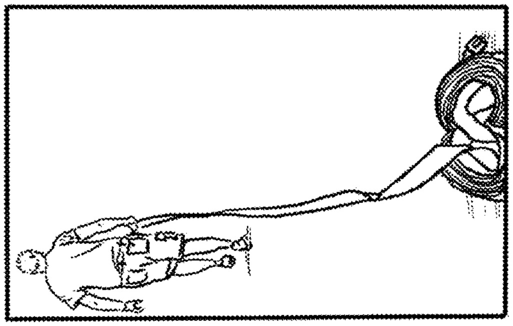
FIG. 7D illustrates hose deployment at a step when the roll of hose is beginning to be flaked out.

FIG. 7D illustrates hose deployment at a step when the roll of hose is beginning to be flaked out.

Figure 7E:
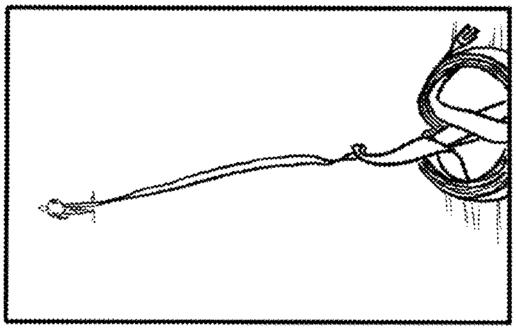
FIG. 7E illustrates hose deployment at a step when the roll of hose is halfway deployed.

FIG. 7E illustrates hose deployment at a step when the roll of hose is halfway deployed.

Figure 7F:
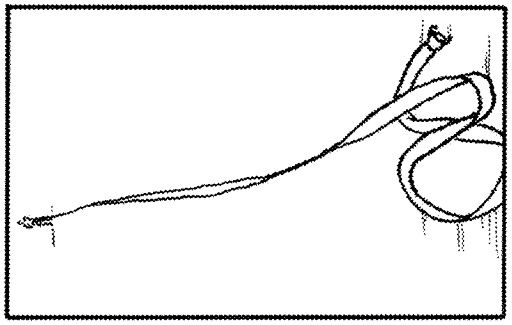
FIG. 7F illustrates hose deployment at a step when the roll of hose is deployed with final inches left.

FIG. 7F illustrates hose deployment at a step when the roll of hose is deployed with final inches left.

The embodiments described in this document provide non-limiting examples of possible implementations of the present technology. Upon review of the present disclosure, a person of ordinary skill in the art will recognize that changes may be made to the embodiments described herein without departing from the scope of the present technology.

The invention claimed is:

1. A hose roller, comprising
- a handle;
- an input shaft coupled to the handle to be rotatably drivable by rotation of the handle;
- a sun sprocket drivably coupled to the input shaft to be rotatably driven by the input shaft;
- a planetary sprocket offset from the sun sprocket lateral to a rotational axis of the input shaft;
- a chain engaged with the sun sprocket and the planetary sprocket to drivably couple the planetary sprocket to the sun sprocket;
- an intermediate shaft coupled to the planetary sprocket to be rotatably drivable by the planetary sprocket;
- an output shaft angled relative to the intermediate shaft and offset from the input shaft lateral to the rotational axis;
- a universal joint connected to the intermediate shaft and the output shaft to drivably couple the output shaft to the intermediate shaft;
- an output support offset from the input shaft and connected to the input shaft to be rotatably driven by the input shaft around the input shaft;
- an output shaft bearing disposed between the output shaft and the output support to support the output shaft by the output support and to allow rotation of the output shaft relative to the output support; and
- a spool coupled to the output shaft to be rotatably driven by the output shaft and engageable with a hose so as to form a figure eight hose roll by rotation of the handle.

2. The hose roller of claim 1, wherein the spool comprises a tubular body that tapers away from the output shaft, the tubular body defining a longitudinally extending slit formed in the tubular body.

* * * * *